Figure 5:
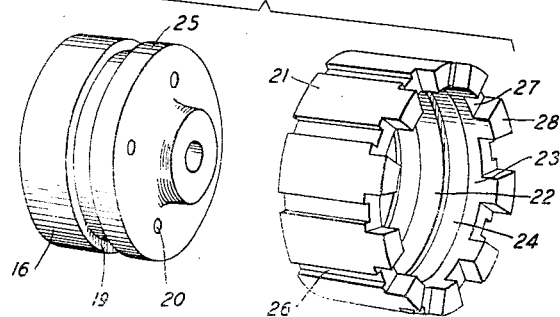

May 25, 1943.  W. M. BISHOP ET AL  2,320,170
CUSHION MOUNTING FOR ELECTRICAL APPARATUS
Filed April 21, 1942   2 Sheets-Sheet 1
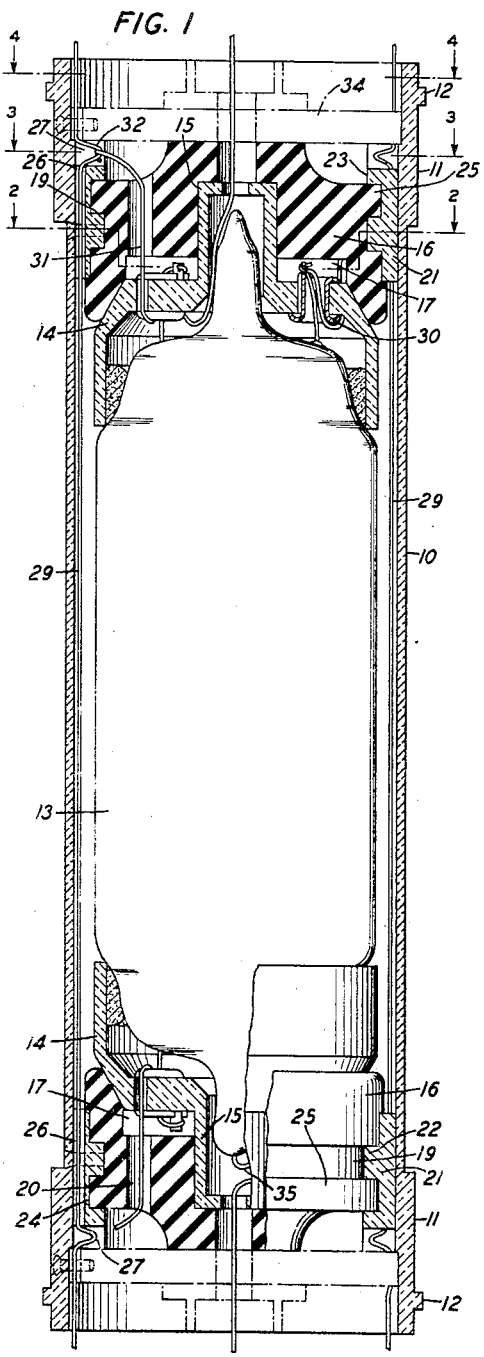
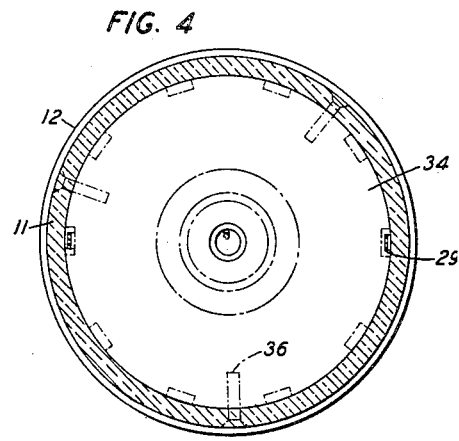
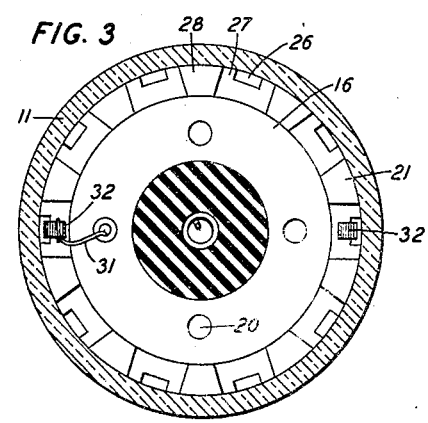
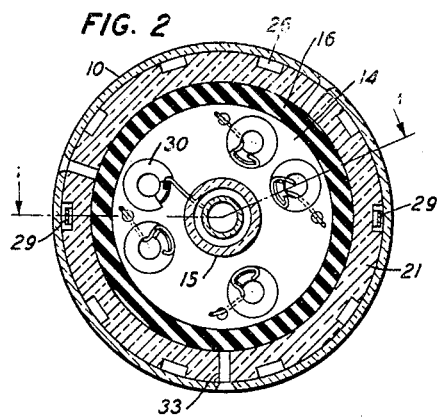
INVENTORS: W. M. BISHOP
C. DEPEW
W. GRONROS
V. L. RONCI
BY Walter C. Kiesel
ATTORNEY

INVENTORS: W. M. BISHOP
C. DEPEW
H. GRONROS
V. L. RONCI

ATTORNEY

Patented May 25, 1943

2,320,170

UNITED STATES PATENT OFFICE 2,320,170

CUSHION MOUNTING FOR ELECTRICAL APPARATUS

Walter M. Bishop, Flushing, N. Y., Charles Depew, Oakland, N. J., and Warren Gronros, New York, and Victor L. Ronci, Brooklyn, N. Y., assignors to Bell Telephone Laboratories, Incorporated, New York, N. Y., a corporation of New York Application April 21, 1942, Serial No. 439,880

12 Claims. (Cl. 250—27.5)

This invention relates to mountings and more particularly to cushion mountings for electrical apparatus.

An object of the invention is to protect electrical apparatus, such as a fragile electron discharge device, from shocks and external deleterious vibrations which may affect the dynamic and electrostatic characteristics thereof.

A further object of the invention is to facilitate the cooperation of the device with other related apparatus in a communicating system, such as a built-in amplifier or repeater in an undersea or ocean cable.

A submarine cable communicating system, particularly of the type in which the amplifier or repeater apparatus is hermetically sealed in water-tight cable housings at predetermined spaced intervals to reinforce the signals and speech traversing the cable, is disclosed in U. S. Patent 2,020,297 issued November 12, 1935, to O. E. Buckley and O. B. Jacobs.

The attenuation of the amplifier apparatus in the cable length necessarily requires a housing of larger diameter than the cable proper so that the tumorous configuration of the cable length renders it extremely difficult to handle in transportation and laying. Furthermore, the bulbous sections tend to accumulate marine growth more readily due to resistance to sea currents and constitute a hazard, since the cable cannot easily be raised for repair and the cable does not rest on the ocean bottom, thereby endangering the seals of the amplifier sections.

In order to overcome these difficulties and increase the efficiency of the cable, it is proposed to enclose the repeater or amplifier elements in series relation at spaced intervals in the cable without substantially changing the exterior diameter of the cable, i. e., the repeater sections of the cable are not substantially greater than the diameter of the cable proper. This subject-matter is disclosed and claimed in a copending application Serial No. 439,881, filed April 21, 1942, of W. M. Bishop.

In accordance with the present invention, which is concerned primarily with one of the units of the amplifier apparatus, as disclosed in the above copending application, a cartridge type housing or mounting is provided in which an electron discharge device or other related electrical apparatus is supported in shock-proof relation in cushion inserts extending into opposite ends of the cartridge housing, the device being securely held in the housing and prevented from being displaced in a rotary direction, so that the device is maintained in a fixed position relative to a plurality of continuous bus tapes or conductors located between the exterior of the device and the inner wall of the cartridge housing. The end cushion inserts are provided with passageways for the tapes to facilitate the connection of the various elements of the discharge device thereto.

In a specific embodiment of the invention, the cartridge housing comprises a cylindrical member or casing of insulating material, the cartridge being of a diameter to fit within the cable sheath and provided with circular abutments on the end exterior surfaces to space the cartridge away from the interior surface of the sheath. The casing encloses end spacer members in the form of rings or short cylinders or sleeves having an interior circular abutment intermediate the ends thereof and the exterior surface being slotted or ridged to provide passageways or channels between the spacer members and the wall of the casing. The outermost end of each spacer member is castellated to provide protective areas for short knee bends in the bus tapes to which flexible connections from the discharge device are secured.

Each spacer member supports a preformed soft rubber cushion closure or stopper having an ananular recess, which interlocks with the inner ridge of the spacer member to securely maintain the closure in the spacer member and a socket portion in the closure is provided to receive the discharge device. The discharge device is provided with a cup-shaped base at each end having a central projection which fits into the socket opening of the closure so that the device is frictionally in engagement with the socket portions of the closures.

A feature of this construction is that the discharge device may be assembled with the cushions and spacers on opposite ends and then inserted in the cylindrical housing with the bus tapes in their allotted positions around the assembly.

Another feature relates to the connection of the flexible conductors of the discharge device to the continuous bus tapes. In this arrangement the conductors extend from the end bases of the device and are threaded through apertures in the cushion closure to be connected to the knee bends of the tapes located in the protective portions formed by the castellated ends of the spacer members.

Figure 6:
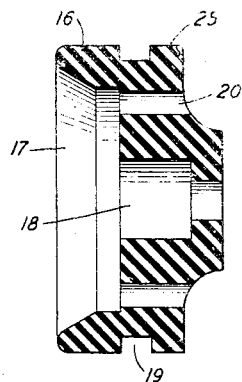

These and other features of the invention will be more clearly understood from the following detailed description when considered with the accompanying drawings:

Fig. 1 is a cross-sectional view in elevation of the cartridge housing forming an embodiment of this invention and illustrating the shock-proof mounting of the device in the unit;

Figs. 2, 3 and 4 are plan views in cross section taken on the respective lines 2—2, 3—3 and 4—4 of Fig. 1;

Fig. 5 is a perspective view of the cushion closure and slotted spacer member in related positions prior to insertion of the closure in the spacer member; and Fig. 6 is a cross-sectional view of the cushion closure.

Referring to the drawings, and particularly to Fig. 1, the shock-proof mounting of this invention is embodied in a cylindrical cartridge housing of rigid insulating material, for example, of a clear phenolic composition, such as "Lucite," free from deleterious impurities including moisture-absorbing materials, so that the various components of the cartridge mountings are not deteriorated to impair their functional operation over a long period of use. The cartridge housing 10 is substantially of uniform diameter over its length except at the extreme ends where the wall is increased in diameter, as shown at 11, and a circular abutment 12 is provided near opposite ends to form a cylindrical spacer to separate the cartridge housing from the inner wall of the cable sheath.

The housing 10 encloses an electron discharge device which includes an enclosing vessel 13, shown in outline, which is provided with end caps or insulating bases 14 provided with central integral projections 15 which extend in opposite directions toward the open ends of the housing, so that the device is situated in the central portion of the cartridge housing. The discharge device is disclosed and claimed in a copending application Serial No. 439,882, filed April 21, 1942, to C. Depew, W. Gronros and V. L. Ronci. The discharge device is supported in shock-proof relation with respect to the cartridge housing at each end by resilient soft rubber cushions 16 which are preformed to provide a socket portion 17 to receive the base 14 of the device, and a cup-shaped opening 18 beyond the socket portion to frictionally engage the extension or projection 15 of the base and securely seat the device in the cushion closures of the cartridge mounting. The cup-shaped opening 18 is slightly smaller in diameter than the extension 15 on the base of the device to insure a tight and completely frictional engagement between the end bases of the device and the cushion closures or stoppers 16. The cushion member is also provided with an external circular grooved or recessed portion 19 situated intermediate the ends of the cylindrical wall portion of the closure member. The cushion is also provided with parallel spaced apertures 20 distributed in a circular boundary around the central portion of the cushion and extending through the cushion wall parallel to the cup-shaped opening 18. The cushion member 16 is interlocked with a ring member 21, of insulating material similar to the cartridge housing, which forms a reinforcing sleeve for the cushion closure and an end spacer member for the assembly of the discharge device within the housing 10 so that the device is spaced away from the inner wall of the housing.

The spacer sleeve or member 21 is provided with an internal ridge 22 which forms a locking connection for the recess 19 in the cushion closure 16. The reinforcing sleeve 21 is also provided with a limit shoulder 23 so that a slot 24 is formed between the ridge 22 and the shoulder to form a seat for the flange portion 25 of the cushion closure. The exterior of the sleeve 21 is provided with longitudinal slots 26 which form passageways between the spacer and the cylindrical housing along the length of the cartridge mounting. The outer edge of the sleeve 21 is provided with milled slots 27 in alignment with the slots 26 so that the edge of the sleeve has a castellated formation by virtue of the distributed projections 28.

A plurality of continuous bus tapes or ribbon conductors 29 are distributed around the discharge device and end closures and are seated in the slots 26 along the length of the cartridge housing to constitute conductors for connecting the discharge device to associated apparatus on opposite ends of the cartridge housing of the discharge device.

The base 14 on each end of the discharge device is provided with terminal members 30 to which are attached the internal elements of the discharge device and the flexible conductors 31 which serve as external connections for the elements of the discharge device. These conductors extend through the apertures 20 in the cushion member 16 and are rigidly secured, as by soldering, to a knee bend portion 32 of the bus tape 29, the knee bend portion 32 being situated in the milled slot portion 27 which forms a protective zone or area for the knee bend of the conductor.

The reinforcing end spacer members 21 are of such diameter as to fit snugly within the interior of the housing 10 so that the tapes 29 are confined in the slots 26 and the device 13 is rigidly held in position in the housing. However, the spacers may be secured to the housing by pins 33 extending through the wall of the housing and the spacer member. The mounting unit including the closures and discharge device are separated from adjacent units by end closure plates 34, shown in dotted line, which may also be securely attached to the cylindrical housing by pins similar to the pins 33 extending through the spacer members. The discharge device is provided with a central conductor 35 which is sealed in a central extension of the enclosing vessel 13 and is connected to one of the terminals 30 on the base, and a flexible conductor 31 extends from the terminal through the projection 15, cushion closure 16 and plate 34, whereby it may be connected to associated apparatus in an adjacent unit. Similarly, one of the conductors connected to a terminal 30 on the base may be threaded through the projection 15 on the opposite end of the device to extend through the cushion and plate and to be attached to associated apparatus in the next succeeding unit of the amplifier assembly.

While the invention has been disclosed with respect to a specific embodiment of the shock-proof mounting of this invention, it is, of course, understood that various modifications may be made in the detailed elements of the assembly without departing from the scope of the invention as defined in the appended claims.

What is claimed is:

1. A mounting for electrical devices comprising a cylindrical casing, hollow spacer members fitted in opposite ends of said casing, a device formed with end caps adapted to be mounted in said casing, and cushion means supported by said spacer members and frictionally engaging said end caps to maintain said device out of contact with said casing.

2. A mounting for electrical devices comprising a cylindrical casing, hollow spacer members in opposite ends of said casing having a slotted exterior surface, a device formed with end caps adapted to be mounted in said casing, cushion means supported by said spacer members and frictionally engaging said end caps to maintain said device out of contact with said casing, continuous conductive tapes extending through said casing and positioned between said casing and spacer members in the slotted portions thereof, and terminal conductors from said device connected to said tapes.

3. A mounting for electrical discharge devices comprising a cylindrical casing, hollow spacer members fitted in opposite ends of said casing, a device formed with end caps adapted to be mounted in said casing, cushion means supported by said spacer members and frictionally engaging said end caps to maintain said device out of contact with said casing, and conductive tapes extending through said casing, said spacer members having longitudinal exterior slots formed therein and the ends thereof castellated for the reception of said tapes and a bent portion thereof located between adjacent castellated portions of said spacer members.

4. A shock-proof mounting comprising a cylindrical casing, sleeve spacer members slidably engaging the inner wall of said casing, a device having end caps adapted to be mounted in said casing, a cushion closure adjacent each spacer member, said closure having a socket portion to receive an end cap of said device, and interlocking means on said closure and spacer member to securely maintain said closure in position with respect to said spacer member.

5. A shock-proof mounting comprising a cylindrical casing, a castellated ring member having an internal annular ridge portion fitted in each end of said casing, a device having end caps adapted to be mounted in said casing, a cushion closure adjacent each ring member, said closure having a socket portion to receive an end cap of said device, and an annular recess on the exterior surface, said ridge portion being seated in said recess and said cushion closure being held in said spacer member, a plurality of conductive tapes extending through said casing, said tapes having a loop portion positioned near the end of said castellated ring member, and short flexible connections between said end caps and said loop portions.

6. A mounting comprising a cylindrical casing, an electron discharge device having an end base portion adapted to be supported therein, a cushion member frictionally engaging the base portion of said device, and a reinforcing sleeve surrounding said cushion, said sleeve being slidably fitted into engagement with said casing to support said device against shock contact with said casing.

7. A mounting comprising an insulating cylindrical casing, an electron discharge device having an end base portion adapted to be supported therein, a soft rubber cushion member frictionally engaging the base portion of said device, and an insulating reinforcing sleeve surrounding said cushion, said sleeve being slidably fitted into engagement with said casing to support said device against shock contact with said casing.

8. A mounting for an electron discharge device comprising a cylinder of insulating material adapted to enclose said device, said device having a terminal base at each end, a cushion member engaging each base within said cylinder, and an end spacer member frictionally mounted in each end of said cylinder and supporting said cushion member.

9. A shock-proof mounting for electron discharge devices having a central projection on each end thereof, comprising an elongated cylindrical casing of rigid insulating material, resilient cushion members forming closures at opposite ends of said casing, said members having a socket portion adapted to frictionally engage the central projection on the ends of said device, and a reinforcing sleeve member interposed between each cushion member and said casing.

10. A shock-proof mounting for electron discharge devices having a central projection on each end thereof, comprising an elongated cylindrical casing of rigid insulating material, resilient cushion members forming closures at opposite ends of said casing, said members having a socket portion adapted to frictionally engage the central projection on the ends of said device, and a reinforcing sleeve member interposed between each cushion member and said casing, said sleeve member being securely fixed to said cushion member and frictionally fitted into said casing.

11. A cushion support for an electron discharge device comprising an elongated shell casing, soft rubber cushion stoppers closing the ends of said casing, each of said stoppers having a recessed portion adapted to frictionally engage and support said device completely out of contact with the length of said casing, and reinforcing rigid sleeve members affixed to said stoppers and slidably engaging the inner wall of said casing.

12. A mounting for an electron discharge device comprising a pair of resilient cushion members of soft rubber-like material, each having a recessed socket portion adapted to frictionally engage and support the ends of said device, rigid reinforcing sleeve surrounding said members, and means engaging said sleeves to force said cushion members in opposing directions to support said device.

WALTER M. BISHOP.
CHARLES DEPEW.
WARREN GRONROS.
VICTOR L. RONCI.